US008446471B2

(12) United States Patent
Wu et al.

(10) Patent No.: US 8,446,471 B2
(45) Date of Patent: *May 21, 2013

(54) METHOD AND SYSTEM FOR GENERATING SURROUNDING SEAMLESS BIRD-VIEW IMAGE WITH DISTANCE INTERFACE

(75) Inventors: Tung-Chuan Wu, Hsinchu (TW); Li-Kung Huang, Taipei County (TW); Din-Chang Tseng, Taoyuan County (TW); Hsin-Liang Shen, Yunlin County (TW); Kuo-Hsiang Cheng, Taipei County (TW)

(73) Assignee: Industrial Technology Research Institute, Hsin-chu (TW)

( * ) Notice: Subject to any disclaimer, the term of this patent is extended or adjusted under 35 U.S.C. 154(b) by 509 days.

This patent is subject to a terminal disclaimer.

(21) Appl. No.: 12/731,419

(22) Filed: Mar. 25, 2010

(65) Prior Publication Data
US 2011/0157361 A1 Jun. 30, 2011

(30) Foreign Application Priority Data
Dec. 31, 2009 (TW) .............................. 98146148 A

(51) Int. Cl.
*H04N 7/18* (2006.01)
*H04N 5/225* (2006.01)
*G06K 9/36* (2006.01)

(52) U.S. Cl.
USPC .......................... 348/148; 348/218.1; 382/284

(58) Field of Classification Search
USPC ...... 348/148, 218.1; 382/104, 284; 340/932.2
See application file for complete search history.

(56) References Cited

U.S. PATENT DOCUMENTS

| 5,515,181 | A | * | 5/1996 | Iyoda et al. | 358/474 |
| 5,884,217 | A | * | 3/1999 | Koyanagi | 701/436 |
| 7,161,616 | B1 | | 1/2007 | Okamoto et al. | |
| 7,298,247 | B2 | * | 11/2007 | Shimizu | 340/435 |
| 7,511,734 | B2 | * | 3/2009 | Ozaki | 348/148 |
| 7,659,835 | B2 | * | 2/2010 | Jung | 340/932.2 |
| 8,150,210 | B2 | * | 4/2012 | Chen et al. | 382/284 |
| 2002/0003571 | A1 | * | 1/2002 | Schofield et al. | 348/148 |
| 2006/0202984 | A1 | | 9/2006 | Yang et al. | |
| 2007/0003108 | A1 | | 1/2007 | Chinomi et al. | |
| 2007/0085901 | A1 | * | 4/2007 | Yang et al. | 348/47 |
| 2008/0043113 | A1 | * | 2/2008 | Ishii | 348/218.1 |
| 2008/0136673 | A1 | | 6/2008 | Jung | |

(Continued)

FOREIGN PATENT DOCUMENTS
CN  1865849 A  11/2006
CN  1878299 A  12/2006

(Continued)

OTHER PUBLICATIONS
China patent office action issued on Feb. 27, 2012.

*Primary Examiner* — John Follansbee
*Assistant Examiner* — Madhu Woolcock
(74) *Attorney, Agent, or Firm* — Rabin & Berdo, P.C.

(57) ABSTRACT

The present invention provides a method and system for generating a surrounding seamless bird-view image with distance assistance interface, which process a plurality of surrounding images associated with a carrier captured by different image sensing devices. After that, an assistant marking is determined according to the relationship between acquired image space and the real space and thereby is formed on the surrounding seamless bird-view image so as to assist the driver in the carrier for avoiding collision or events affecting the safety being occurred.

21 Claims, 15 Drawing Sheets

U.S. PATENT DOCUMENTS

| | | | |
|---|---|---|---|
| 2008/0159594 A1 | 7/2008 | Chiu et al. | |
| 2008/0181488 A1* | 7/2008 | Ishii et al. | 382/154 |
| 2008/0231710 A1* | 9/2008 | Asari et al. | 348/187 |
| 2008/0266408 A1 | 10/2008 | Kim | |
| 2009/0015675 A1* | 1/2009 | Yang | 348/148 |
| 2009/0022423 A1* | 1/2009 | Ehlgen et al. | 382/284 |
| 2009/0097708 A1 | 4/2009 | Mizuta | |
| 2009/0122140 A1 | 5/2009 | Imamura | |
| 2010/0092042 A1* | 4/2010 | Asari | 382/106 |
| 2010/0194886 A1* | 8/2010 | Asari et al. | 348/148 |
| 2010/0259371 A1* | 10/2010 | Wu et al. | 340/435 |
| 2011/0026771 A1* | 2/2011 | Hsu et al. | 382/104 |
| 2012/0002057 A1* | 1/2012 | Kakinami | 348/187 |

FOREIGN PATENT DOCUMENTS

| | | |
|---|---|---|
| CN | 101256073 | 9/2008 |
| DE | 102008006308 | 8/2008 |
| DE | 102008030104 | 2/2009 |
| DE | 102008046214 | 4/2009 |
| DE | 102008046544 A1 | 5/2009 |
| DE | 102008057671 | 7/2009 |
| JP | 11-348659 | 12/1999 |
| JP | 2001114048 A | 4/2001 |
| JP | 2001116567 A | 4/2001 |
| JP | 2001187553 | 7/2001 |
| JP | 2002087160 | 3/2002 |
| JP | 2004354326 | 12/2004 |
| JP | 2005012465 | 1/2005 |
| JP | 2005239048 | 9/2005 |
| JP | 2006015869 | 1/2006 |
| JP | 2006121587 A | 5/2006 |
| JP | 2006151370 | 6/2006 |
| JP | 2006268076 | 10/2006 |
| JP | 2006287892 A | 10/2006 |
| JP | 2006303985 A | 11/2006 |
| JP | 2007036668 A | 2/2007 |
| JP | 2007109166 A | 4/2007 |
| JP | 2007235529 | 9/2007 |
| JP | 2007235842 | 9/2007 |
| JP | 2007274377 A | 10/2007 |
| JP | 2007282060 A | 10/2007 |
| JP | 2007316685 | 12/2007 |
| JP | 2007316790 | 12/2007 |
| JP | 2008017311 A | 1/2008 |
| JP | 2008-048317 A | 2/2008 |
| JP | 2008048094 | 2/2008 |
| JP | 2008048345 A | 2/2008 |
| JP | 2008083786 | 4/2008 |
| JP | 2008085446 | 4/2008 |
| JP | 2008153882 | 7/2008 |
| JP | 2009027576 | 2/2009 |
| JP | 2009083680 A | 4/2009 |
| TW | 200927537 A | 7/2009 |
| WO | 2009044654 A1 | 4/2009 |
| WO | 2009116327 A1 | 9/2009 |
| WO | 2009119337 A1 | 10/2009 |

* cited by examiner

METHOD AND SYSTEM FOR GENERATING SURROUNDING SEAMLESS BIRD-VIEW IMAGE WITH DISTANCE INTERFACE

TECHNICAL FIELD

The present disclosure relates to an image processing technique, and more particularly, to a method and system for generating surrounding seamless bird-view image with distance interface.

TECHNICAL BACKGROUND

Image-based vehicle maneuvering assistant methods and systems had been available and used for many years. However, most such conventional image-based vehicle maneuvering assistant methods and systems are only designed to display images surrounding their corresponding vehicles to drivers directly and exactly as they are being captured in their image sensing devices. Thus, in despite of they actually are helpful with respect to driving assistance, they can sometimes create a kind of visual burden to drivers with the increasing of image sensing devices since there can be a plurality of images from the image sensing devices crowding in one monitoring screen. For overcoming such problem, it is in need of a technique for constructing a surrounding seamless bird-view image by the use of a plurality of surrounding images captured respectively from different image sensing devices. Such technique for constructing a full image in the bird's eye view surrounding a vehicle is becoming the mainstream in the automobile manufacturing industry when it come to the developing of a more advance and safer vehicle. Operationally, the surrounding images from common image sensing devices installed on various locations of a vehicle are processed and converted into corresponding bird-view images which are then being combined into a full image in the bird's eye view surrounding the vehicle to be provided to the vehicle's driver, and thereby, the driving safety of the vehicle enhanced.

However, the key issue for combining the plural surrounding images captured respectively by different image sensing devices located at different positions on a vehicle is to recognize and determine if there is an overlapped region in two surrounding images captured by any two image sensing devices that are adjacent to each other. One method for dealing with the aforesaid key issue is disclosed in U.S. Pat. Pub. No. 2007/0003108, which reveals a technique for combing a plurality of images taken by plural cameras focusing in different directions around a vehicle into a bird-view image showing the entire view surrounding the vehicle. However, as the bird-view image is divided into plural regions by setting mask line at each joining line between adjacent images, the bird-view image in this disclosure is not seamless combined. That is, the various surrounding images taken by the plural cameras in different directions around the vehicle are not combined seamlessly that there can be overlapped region existed in two images taken by any two adjacent cameras, and therefore, it may required to have ultrasonic radar detectors to be arranged on the vehicle at positions corresponding to the overlapped regions as alarming devices for assisting the maneuvering of the vehicle. Nevertheless, the arranging of the ultrasonic radar detectors is going to cost the manufacturing cost of the aforesaid system to increase.

Moreover, in a driving support system disclosed in U.S. Pat. Pub. No. 2006/0202984, different all-round bird-view images are generated from the images taken by four cameras mounted on a vehicle according to the case where the vehicle is stopped, the case where the vehicle is driven forward, and the case where the vehicle is driven in reverse while the depression angle of each camera for capturing images is defined by the height between the corresponding camera and the ground, by that the system is able to simulate and acquire a larger all-round bird-view image showing the entire view surrounding the vehicle. In Japanese Patent Laid-Open Publication No. 2008-048317, a method for weighting corresponding features in the overlapped region between two images taken by two adjacent cameras that are mounted on a carrier, by which the two images can be combined in a manner that the features with higher weights are preserved in the overlapped region while the corresponding feature with smaller weight in the overlapped region are deleted, and thereby, various surrounding images taken by the plural cameras in different directions around the carrier can be combined into a bird-view image showing the entire view surrounding the carrier. In U.S. Pat. Pub. No. 2009/0097708, an image-processing system for processing image data obtained by capturing a plurality of images outside a periphery of a vehicle is provided, in which a plurality of image-capturing units, being affixed to the vehicle, are used for generating bird-view images outside the periphery of the vehicle in a manner that end portions of real spaces corresponding to two adjacent bird-view images overlap each other, and accordingly the generated bird-view images are provided to an image-composition unit where they are combined into a bird-view-composite image according to a predetermined layout as each overlap portion being included are determined to be a border image that is provided to be superimposed on its corresponding bird-view image. Thus, by the composition of those bird-view images with borders, a surrounding bird-view image showing the entire view surrounding the vehicle can be achieved. In Japanese Patent Laid-Open Publication No. 2006-121587, an operation supporting device capable of suppressing deterioration in image quality due to the joint between images is provided, by which the device changes the joint position of images in image synthesis when the bird-view image is created to a position different from the previous one. Therefore, the joint does not continuously exist at a fixed position in the bird-view image, thus preventing an object from being displayed discontinuously at the joint between the images, preventing the object from continuing to disappear, and hence suppressing the deterioration of the image quality caused by the joint between the images. It is noted that the key issues in the abovementioned four patents for combining the plural surrounding images captured respectively by different image sensing devices located at different positions on a vehicle are to recognize and determine if there is an overlapped region in two surrounding images captured by any two image sensing devices that are adjacent to each other. Then, as each surrounding image is transformed into a corresponding bird-view image with reference to the location of its corresponding image sensing devices, the plural bird-view images can be combined with reference to the identified overlapped regions so as to layout and achieve a surrounding bird-view image showing the entire view surrounding the vehicle.

In addition, in U.S. Pat. No. 7,161,616, an image processing apparatus is provided, which includes an image processing part for receiving images captured by a plurality of cameras shooting surroundings of a vehicle to generate a synthetic image from these camera images, wherein the image processing part uses mapping data describing a correspondence relationship between pixels of the synthetic image and a plurality of pixel data including one or both of pixel data of the camera images and pixel data other than the camera images, and describing the rate of necessity with respect to each of the pixel data, and weights each pixel data in accordance with the rate of necessity, thereby generating the pixel data of the pixels of the synthetic image.

TECHNICAL SUMMARY

The present disclosure provides a method and system for generating surrounding seamless bird-view image with distance interface, capable of combining surrounding images of a carrier that are captured by image sensing devices into a surrounding seamless bird-view image having marking aids for distance estimation marked on the same to be used as reference for assisting a driver of the carrier for avoiding collision or preventing events affecting the safety from happening.

Moreover, the present disclosure provides a method and system for forming surrounding seamless bird-view image, being adapted for a variety of carriers having a plurality of cameras mounted thereon with different field-of-views, by which a surrounding seamless bird-view image showing the entire view surrounding the carrier can be achieved by the use of a calibration process and a bird-view conversion algorithm with the assistance of information relating to known ground features. Thereby, during the movement of the carrier, the corresponding relationship between the moving direction of the carrier and ambient environment can be identified and recognized by the carrier's driver from the seamless bird-view image without being misled or confused by the joints between any two adjacent images for forming the seamless bird-view image.

In an embodiment, the present disclosure provides a method and system for generating surrounding seamless bird-view image with distance interface, comprising the steps of: providing a plurality of surrounding images; converting the plural surrounding images so as to combine the plural converted surrounding images into a surrounding seamless bird-view image; and generating an auxiliary image containing marking aids for distance estimation in the surrounding seamless bird-view image.

In another embodiment, the present disclosure provides a system for generating surrounding seamless bird-view image with distance interface, comprising: a plurality of imaging units, respectively mounted on a carrier at different positions thereof, each being used for generating a surrounding image; a control unit, for receiving the plural surrounding images to be used in a viewpoint transformation process for converting those surrounding images into a surrounding seamless bird-view image signal, while enabling the control unit to generate an auxiliary image signal containing marking aids for distance estimation; and a display unit, for receiving the surrounding seamless bird-view image signal and the auxiliary image signal so as to display a surrounding seamless bird-view image corresponding to the surrounding seamless bird-view image signal while forming marking aids contained in the auxiliary image signal on the surrounding seamless bird-view image.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
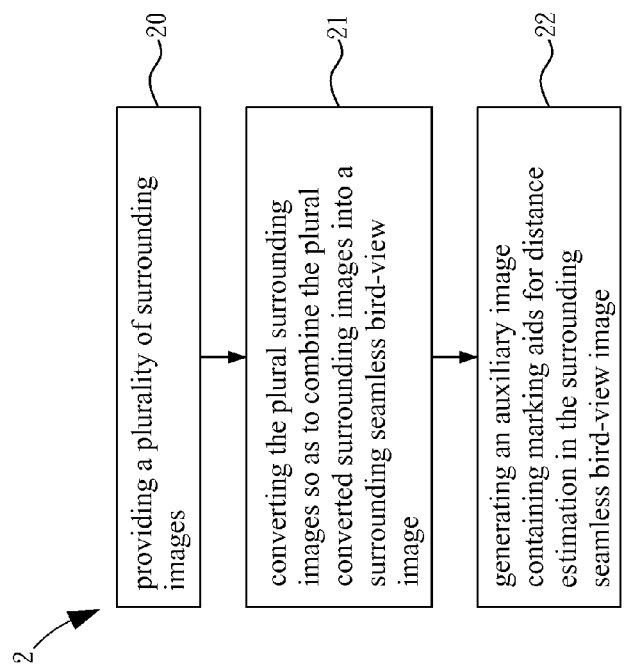
FIG. 1 a flow chart depicting the steps of a method for generating surrounding seamless bird-view image with distance interface according to an embodiment of the present disclosure.

Please refer to FIG. 1, which is a flow chart depicting the steps of a method for generating surrounding seamless bird-view image with distance interface according to an embodiment of the present disclosure. The flow shown in FIG. 1 starts from step 20. At step 20, there is a plurality of surrounding images being provided; and then the flow proceeds to step 21. It is noted that each of the plural surrounding images is an image showing a portion of ambient environment surrounding a carrier, whereas the carrier can be a vehicle. Moreover, the plural surrounding images can be generated by the use of a plurality of image sensing devices as the plural image sensing devices are mounted on a carrier at different positions thereof while focusing in different directions around the carrier. In addition, each image sensing device can be a CCD or a CMOS. Please refer to FIG. 3A, which is a schematic diagram showing how a plurality of surrounding images is to be captured by the use of different image sensing devices mounted on a carrier respectively at different positions thereof in the present disclosure. In the embodiment shown in FIG. 3A, there are four image sensing devices 900~903 being respectively mounted on the front side, the rear side, the left side and the right side of the carrier 90 for capturing surrounding images 91~94.

As soon as the plural surrounding images are obtained, the flow proceeds to step 21. At step 21, the plural surroundings is converted and then being combined into a surrounding seamless bird-view image; and then the flow proceeds to step 22. Please refer to FIG. 2, which is a flow chart depicting the steps for converting and combining the plural surrounding images into a surrounding seamless bird-view image according to an embodiment of the present disclosure. The flow of FIG. 2 starts from step 210. At step 210, a viewpoint transformation process is performed upon the plural surroundings for transforming the same into a plurality of corresponding bird-view images; and then the flow proceeds to step 211. Specifically, as soon as the plural surrounding images are obtained by the use of different image sensing devices mounted on the carrier respectively at different positions thereof, the surrounding images are first being calibrated for eliminating fish eye effect or any deformation, and then are processed by the viewpoint transformation process for converting those surrounding images into corresponding bird-view images, as those shown in FIG. 3B. In FIG. 3B, the front, the rear, the left and the right bird-view images 91a~94a are converted from their corresponding surrounding images 91~94 in respectively. It is noted that the calibration technique for eliminating fish eye effect and deformation is known to those skilled in the art and thus will not be described further herein.

Figure 3A:
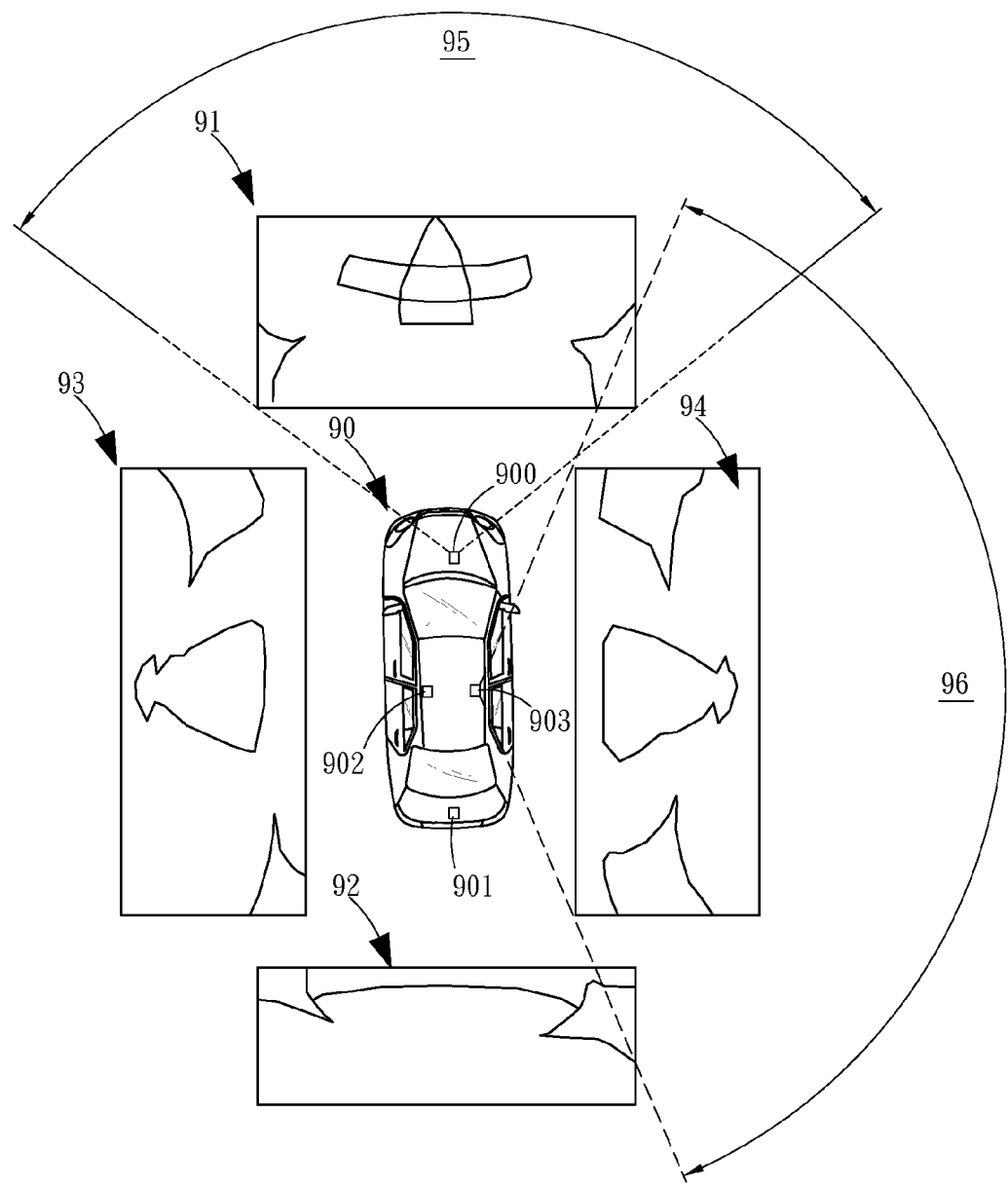
FIG. 3A is a schematic diagram showing how a plurality of surrounding images is to be captured by the use of different image sensing devices mounted on a carrier respectively at different positions thereof in the present disclosure.
Figure 3B:
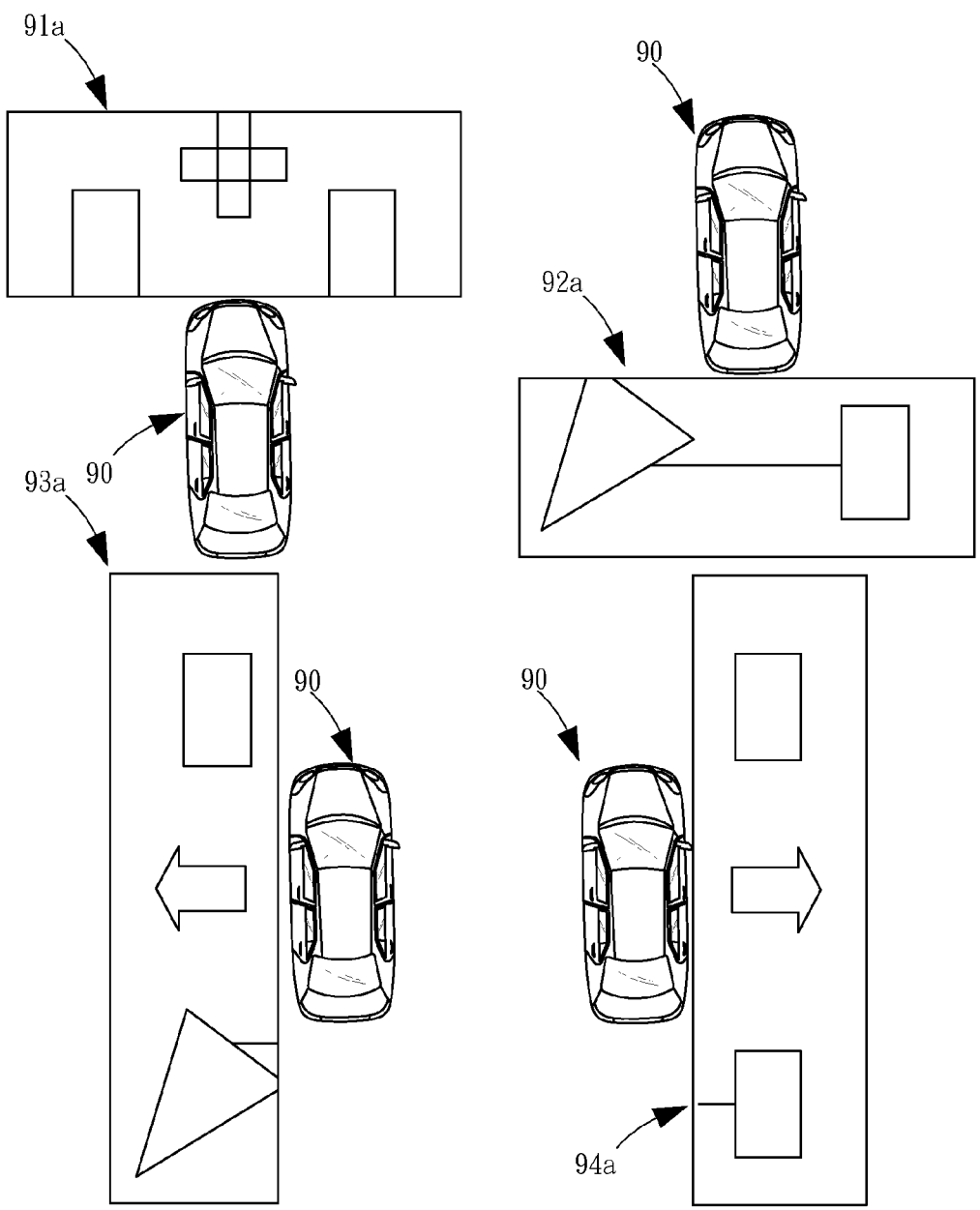
FIG. 3B is a schematic diagram showing how the plural surrounding images are to be converted into corresponding bird-view images in the present disclosure.
Figure 3C:
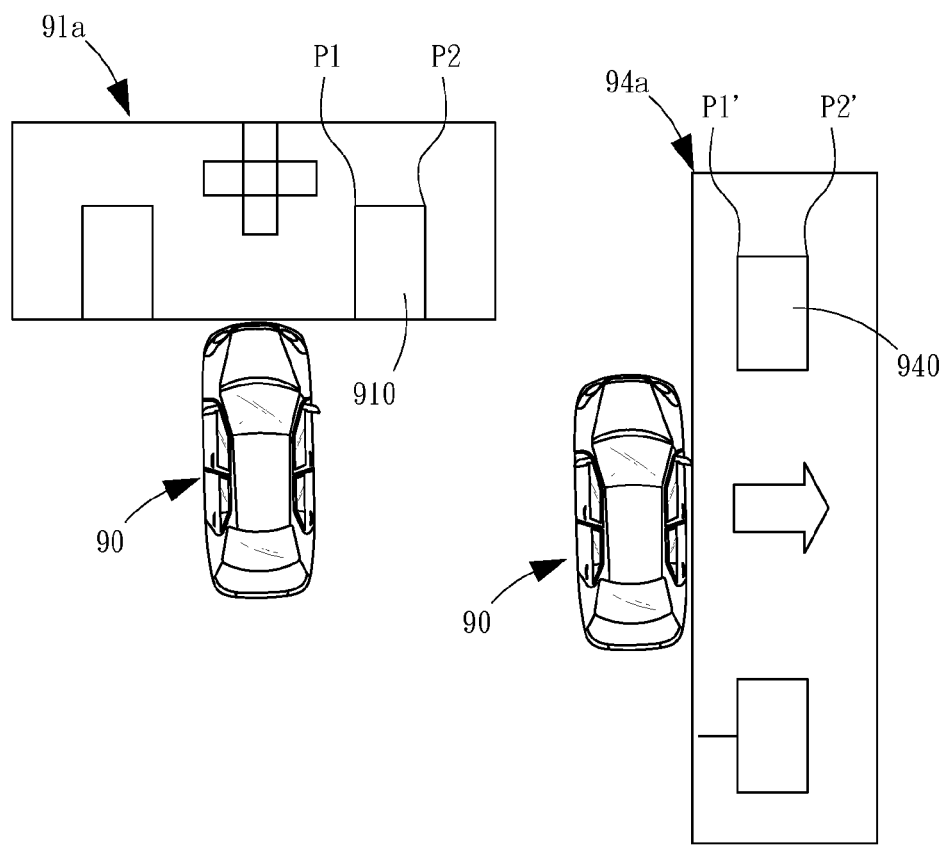
FIG. 3C is a schematic diagram showing the acquisition of one pair of corresponding points in two adjacent bird-view images of the present disclosure.
Figure 4:
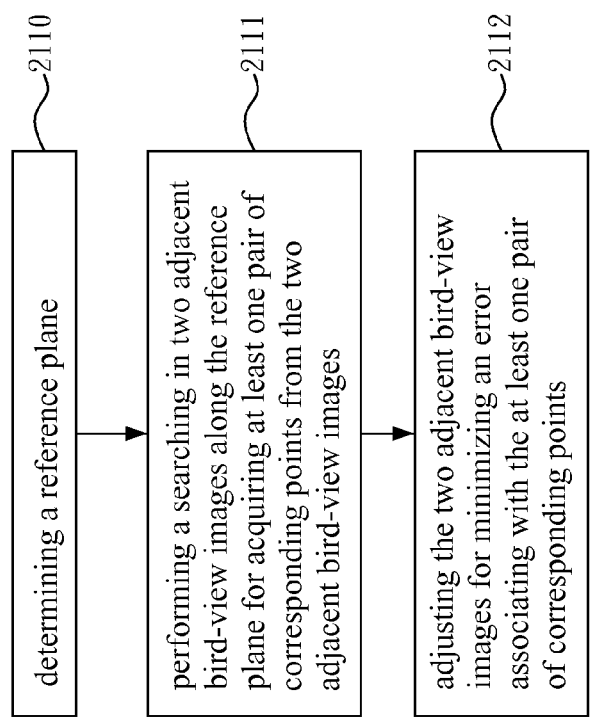
FIG. 4 is a flow chart depicting the steps for identifying overlapped regions in the present disclosure.

At step 211, an overlapped region is identified from any two adjacent bird-view images; and then the flow proceeds to step 212. Taking the surrounding images 91 and 94 captured by the front image sensing device 900 and the right image sensing device 903 for example, as the field-of-views of the two image sensing devices 900 and 903 are overlapped with each other by a portion thereof, there can be objects in the ambient of the carrier 90 being captured the two image sensing devices 900 and 903 simultaneously in a manner that there can be a portion of such object being existed at the same time in the two the surrounding images 91 and 94, as shown in FIG. 3A. Thus, after being processed by the viewpoint conversion process, there can be an overlapped region existed between any two adjacent bird-view images. In this embodiment shown in FIG. 3B, there is an overlapped region existed respectively in the two bird-view images 91a and 93a, as there is one between the two bird-view images 91a and 94a, as there is one between the two bird-view images 92a and 93a, and as there is one between the two bird-view images 92a and 94a. Thus, by the performing of the step 211, all those overlapped regions can be identified and defined. Please refer to FIG. 4, which is a flow chart depicting the steps for identifying overlapped regions in the present disclosure. The flow of FIG. 4 for identifying overlapped regions starts from step 2110. At step 2110, a reference plane is determined; and then the flow proceeds to step 2111. It is noted that the reference plane is the ground level in this embodiment, but is not limited thereby. At step 2111, a process is performed for searching the two adjacent bird-view images along the reference plane so as to acquire at least one pair of corresponding points from the two adjacent bird-view images; and then the flow proceeds to step 2112. Please refer to FIG. 3C, which is a schematic diagram showing the acquisition of one pair of corresponding points in two adjacent bird-view images of the present disclosure. In FIG. 3C, there is an object having a potion thereof existed at the same time in the two adjacent bird-view images 91a and 94a, which are represented as the FIG. 910 in the bird-view images 91a and the FIG. 940 in the bird-view images 94a. According, by the process performed in step 221, two pairs of corresponding points, i.e. the pair of P1 and P2, and another pair of P1' and P2', can be located on the reference plane. It is noted that each of the corresponding points of the two adjacent bird-view images is a specific object in its corresponding bird-view image selected from the group comprising: lines, patterns and texts.

After corresponding points are located, the flow for identifying overlapped region proceeds to step 2112. At step 2112, the two adjacent bird-view images are adjusted relative to each other for minimizing an error associating with the at least one pair of corresponding points. In this embodiment, the error is defined to be the mean square of the characteristic values respectively associating to the at least one pair of the corresponding points in the two adjacent bird-view images, which is defined by the following equation:

$$\mathrm{err} = \frac{\sum_{i=1}^{n}[I_1(q_{1i}) - I_2(p_{2i})]^2}{n}; \quad (1)$$

$$\text{wherein } p_{2i} = M_{rigid}(q_{1i})$$

n represents the number of pairs of corresponding points located;

$q_{1i}$ is the corresponding point in the $i^{th}$ pair that is existed in the bird-view image 91a;

$p_{2i}$ is the corresponding point in the $i^{th}$ pair that is existed in the bird-view image 94a;

$M_{rigid}(x)$ is an image conversion algorithm, which include rotating, shift and scaling; and $I_j(x)$ represents the characteristic value to the corresponding point existed in the x coordinate in the $j^{th}$ bird-view image, which includes brightness value and color value in this embodiment shown in FIG. 3C.

Figure 3D:
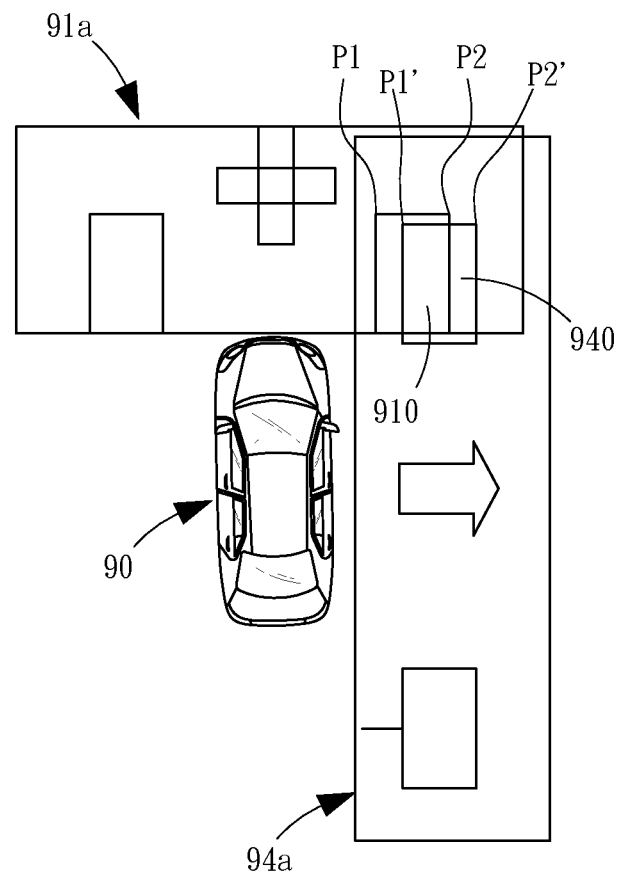
FIG. 3D is a schematic diagram showing how the two adjacent bird-view images can be shifted and adjusted for minimizing the error associating to the pair of corresponding points in the present disclosure.
Figure 3E:
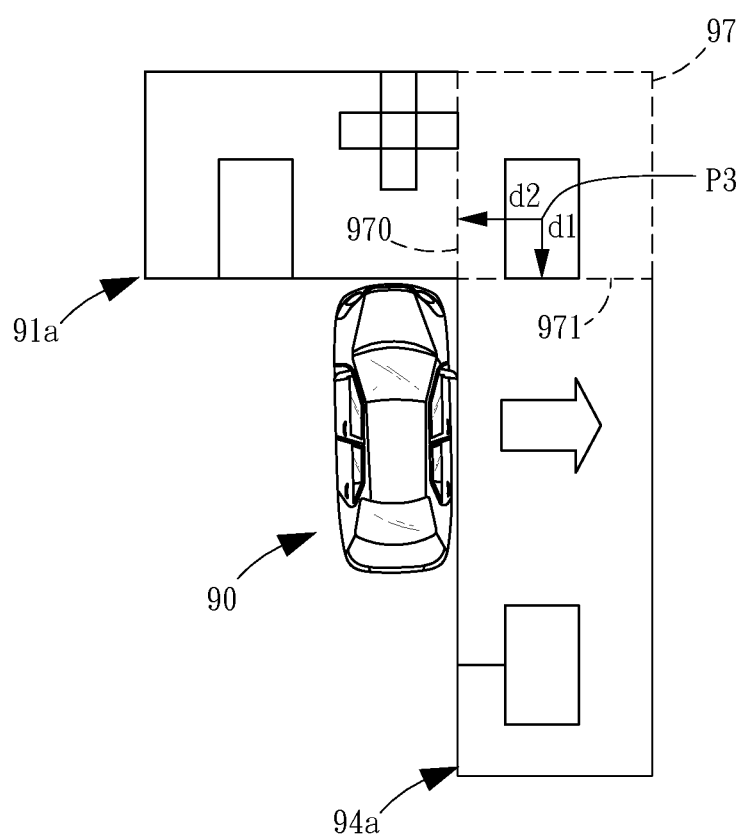
FIG. 3E is a schematic diagram showing how the two adjacent bird-view images can be combined according to the result of a weight calculation process in the present disclosure.

Please refer to FIG. 3D, which is a schematic diagram showing how the two adjacent bird-view images can be shifted and adjusted for minimizing the error associating to the pair of corresponding points in the present disclosure. As there is an error value, i.e. err, being defined and enabled to changed continuously in correspondence to each adjustment when the two adjacent bird-view images are being adjusted relative to each other, it is concluded that when the err is at its minimum, the two adjacent images 91a and 94a are positioned in a manner that the corresponding point P1 in the bird-view image 91a is positioned almost exactly on top of the corresponding point P2 in the bird-view image 94a while the corresponding point P1' in the bird-view image 91a is positioned almost exactly on top of the corresponding point P2' in the bird-view image 94a, as shown in FIG. 3E. Thus, the area defined within the dotted line shown in FIG. 3E is the overlapped image 97 of the two adjacent bird-view images 91a and 94a. Similarly, the overlapped regions between the two adjacent bird-view images 91a and 93a, the two adjacent bird-view images 92a and 93a, and the two adjacent bird-view images 92a and 94a can all be identified.

Figure 2:
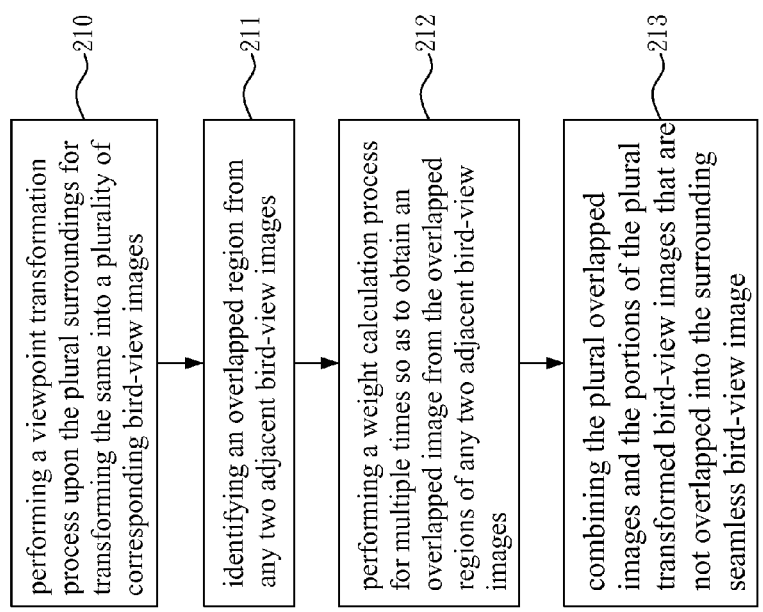
FIG. 2 is a flow chart depicting the steps for converting and combining the plural surrounding images into a surrounding seamless bird-view image according to an embodiment of the present disclosure.
Figure 5:
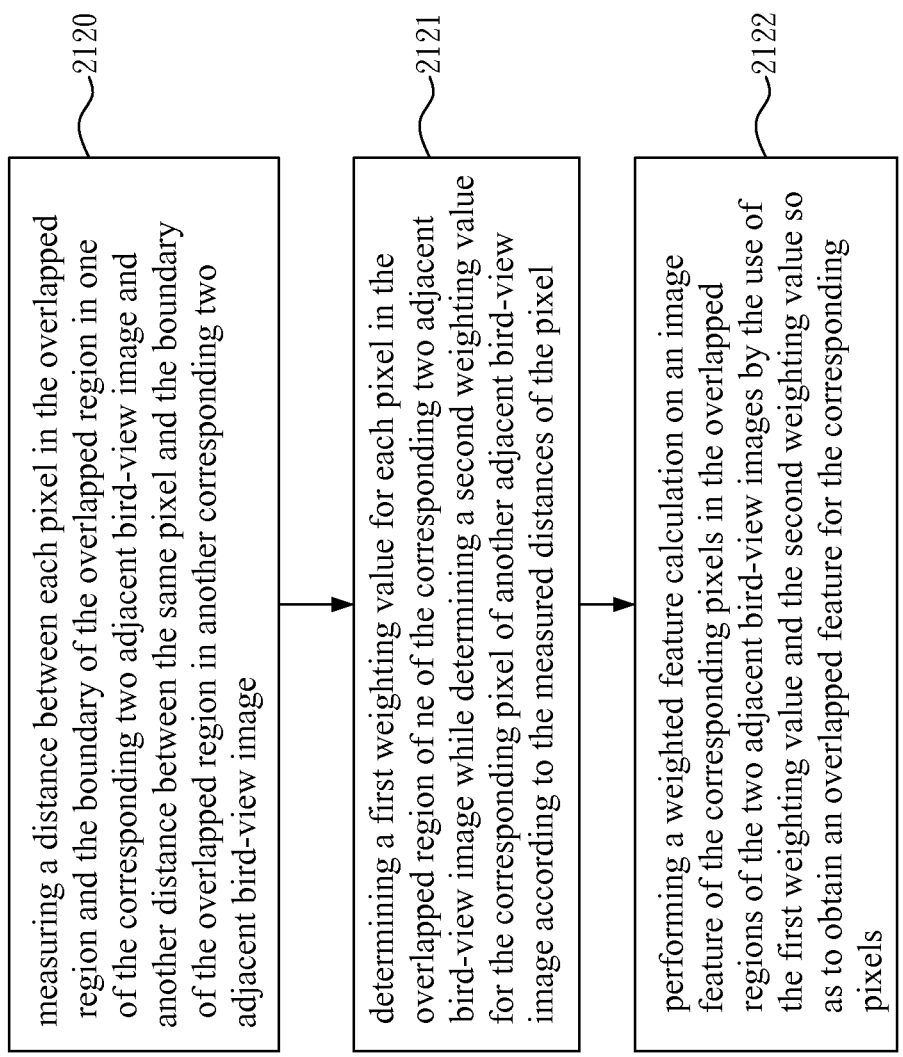
FIG. 5 is a flow chart depicting the steps of a weight calculation process according to an embodiment of the present disclosure.

After the overlapped regions are identified, the flow of FIG. 2 proceeds to step 212. At step 212, a weight calculation process is performed for multiple times so as to obtain an overlapped image from the overlapped regions of any two adjacent bird-view images; and then the flow proceeds to step 213. In order to combined all the bird-view images of the carrier into a surrounding bird-view image showing entire view surrounding the carrier without any blind spots, the two overlapped regions respectively defined in two adjacent bird-view images should be weighted by the weight calculation process for enabling the two the bird-view images to be integrated into one overlapped image so as to preparing two adjacent bird-view images to be combined into the required surrounding bird-view image. Please refer to FIG. 5, which is a flow chart depicting the steps of a weight calculation process according to an embodiment of the present disclosure. The flow of FIG. 5 starts from the step 2120. At step 2120, a process is performed for measuring a distance between each pixel in the overlapped region and the boundary of the overlapped region in one of the corresponding two adjacent bird-view image and another distance between the same pixel and the boundary of the overlapped region in another corresponding two adjacent bird-view image; and then the flow proceeds to step 2121. As shown in FIG. 3E, the distance d1 between the corresponding point P3 and the boundary 971 in the bird-view image 94a and distance d2 between the corresponding point P3 and the boundary 970 in the bird-view image 91a are measured.

At step 2121, a first weighting value for each pixel in the overlapped region of one of the corresponding two adjacent bird-view image is determined and the same time that a second weighting value for the corresponding pixel of another adjacent bird-view image according to the measured distances of the pixel is determined; and then the flow proceeds to step 232. In an embodiment of the present disclosure, the first weighting value and the second weighting value are determined by the following equations:

$$w_1 = \frac{d_2}{d_1 + d_2} \quad (2)$$

$$w_{21} = \frac{d_1}{d_1 + d_2} \quad (3)$$

As shown in FIG. 3E, the weighting value $w_1$ determined according to the two measured distances d1 and d2 represents the contribution of the corresponding point P3 in the overlapped region from the bird-view image 91a, while the weighting value $w_2$ determined according to the two measured distances d1 and d2 represents the contribution of the corresponding point P3 in the overlapped region from another the bird-view image 94a.

After the process of step 2121 is completed, the flow proceeds to step 232. At step 2122, a weighted feature calculation is performed on an image feature of the corresponding pixels in the overlapped regions of the two adjacent bird-view images by the use of the first weighting value and the second weighting value so as to obtain an overlapped feature for the corresponding pixel. In this embodiment, the weighted feature calculation is performed according to the following equation:

$$I(P_3) = w_1 I_1(P'_3) + w_2 I_2(P''_3) \quad (4)$$

According to the abovementioned equation (4), each characteristic value of each pixel $P_3$ in the resulting overlapped image is the sum of the same characteristic values of their corresponding pixels $P'_3$ and $P''_3$ in their respective bird-view images 91a and 94a after being multiplied with their respective weighting values. By performing the steps 2120~2122 upon all the corresponding pixels in their respective overlapped regions of the two adjacent bird-view images 91a and 94a, an overlapped image 97 can be obtained, as shown in FIG. 3E. Similarly, the same process can be applied for the other adjacent bird-view images, such as the two bird-view images 91a and 93a, the two bird-view images 92a and 93a, the two bird-view images 92a and 94a.

Figure 3F:
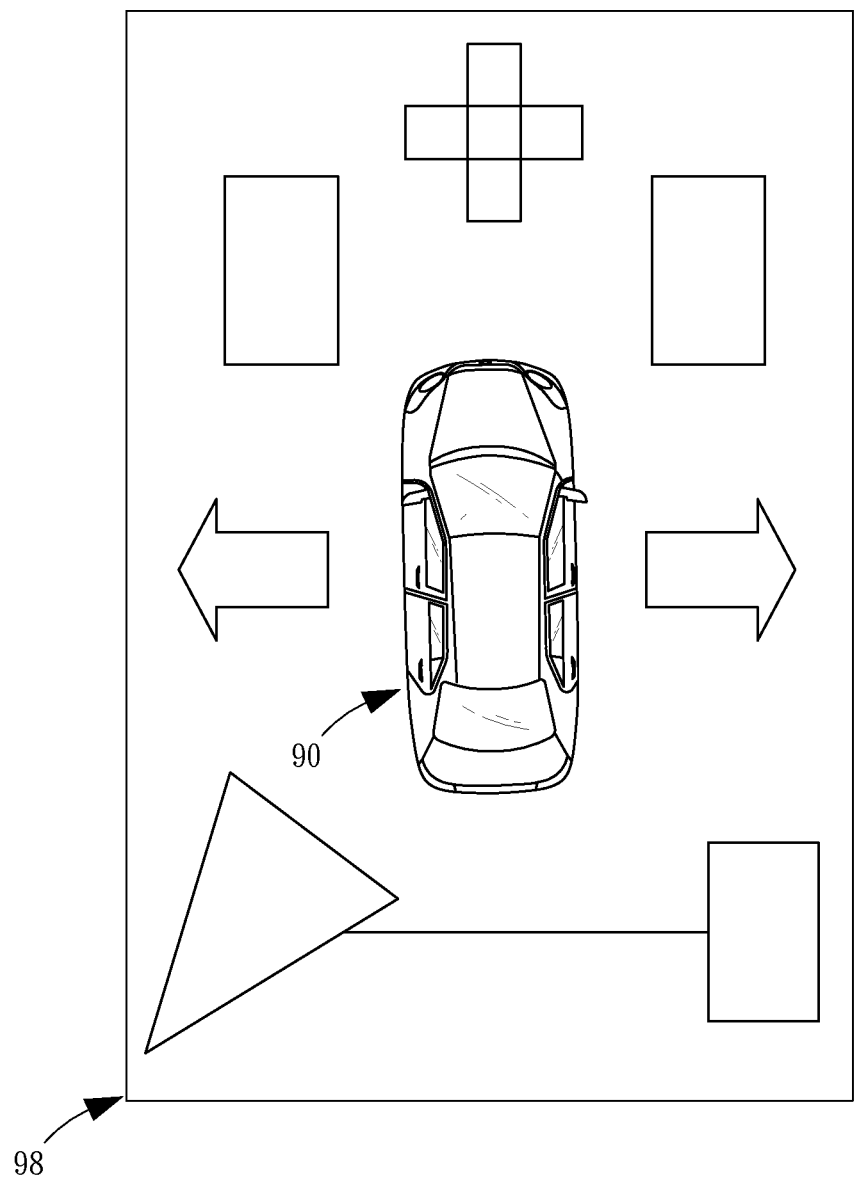
FIG. 3F is a surrounding seamless bird-view image showing the entire view surrounding the carrier according to an embodiment of the present disclosure.

Finally, the flow of FIG. 2 proceeds to step 213. At step 213, the plural overlapped images and the portions of the plural transformed bird-view images that are not overlapped are combined into a surrounding seamless bird-view image, as the surrounding seamless bird-view image 98 shown in FIG. 3F. Since the weighting value of the corresponding points in any two adjacent bird-view images are determined according to their respective boundary distances, each corresponding pixel in the overlapping of the two adjacent images can contribute to the final overlapped image according to the determined weighting value so that there will be no cutting and jointing process required for combining the plural surrounding bird-view images as those did in prior arts, and thus a surrounding seamless bird-view image can be formed.

Figure 6A:
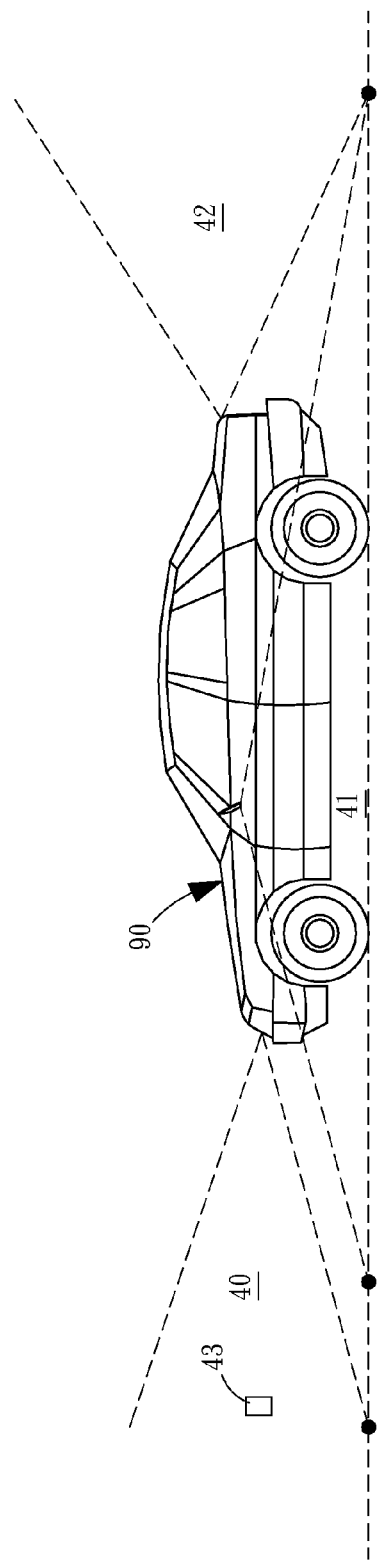
FIG. 6A is a schematic diagram showing a spatial relationship between a carrier and the space where it is located.

After the surrounding seamless bird-view image is formed, the flow proceeds back to step 22 of FIG. 1 for generating an auxiliary image containing marking aids for distance estimation in the surrounding seamless bird-view image. It is noted that each marking aid in the auxiliary image can an icon selected from the group consisting: a scale line and a frame, whichever is capable of representing the conversion between image space captured by the image sensing devices and real space surrounding the carrier with respect to distance. Please refer to FIG. 6A, which is a schematic diagram showing a spatial relationship between a carrier and the space where it is located. As shown in FIG. 6A, there are three image sensing device mounted respectively in front of, at a side of, and on the rear of a carrier 90 while focusing in different directions around the carrier 90 that the view of the front image sensing device is defined by the field-of-view 40, the view of the side image sensing device is defined by the field-of-view 41 and the view of the rear image sensing device is defined by the field-of-view 42. Taking the field-of-view 40 for instance, the distance between any object in the field-of-view 40 and the carrier 90 in real space can be obtained by a calculation performed upon each pixel relating to the object in the image space that existed in the surrounding image captured by the front image sensing device.

Figure 6B:
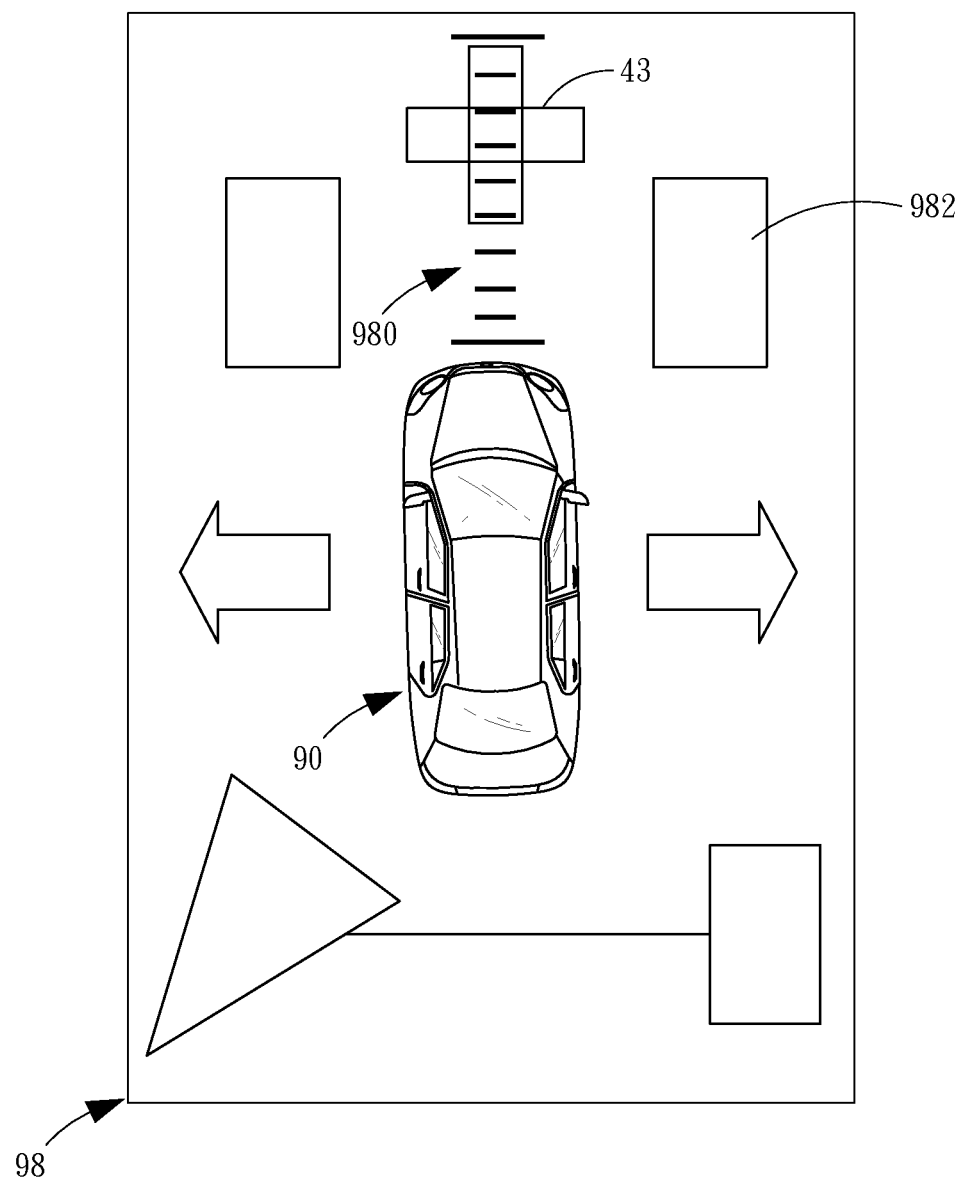
FIG. 6B and FIG. 6C are different auxiliary images containing different marking aids for distance estimation according to the present disclosure.
Figure 6C:
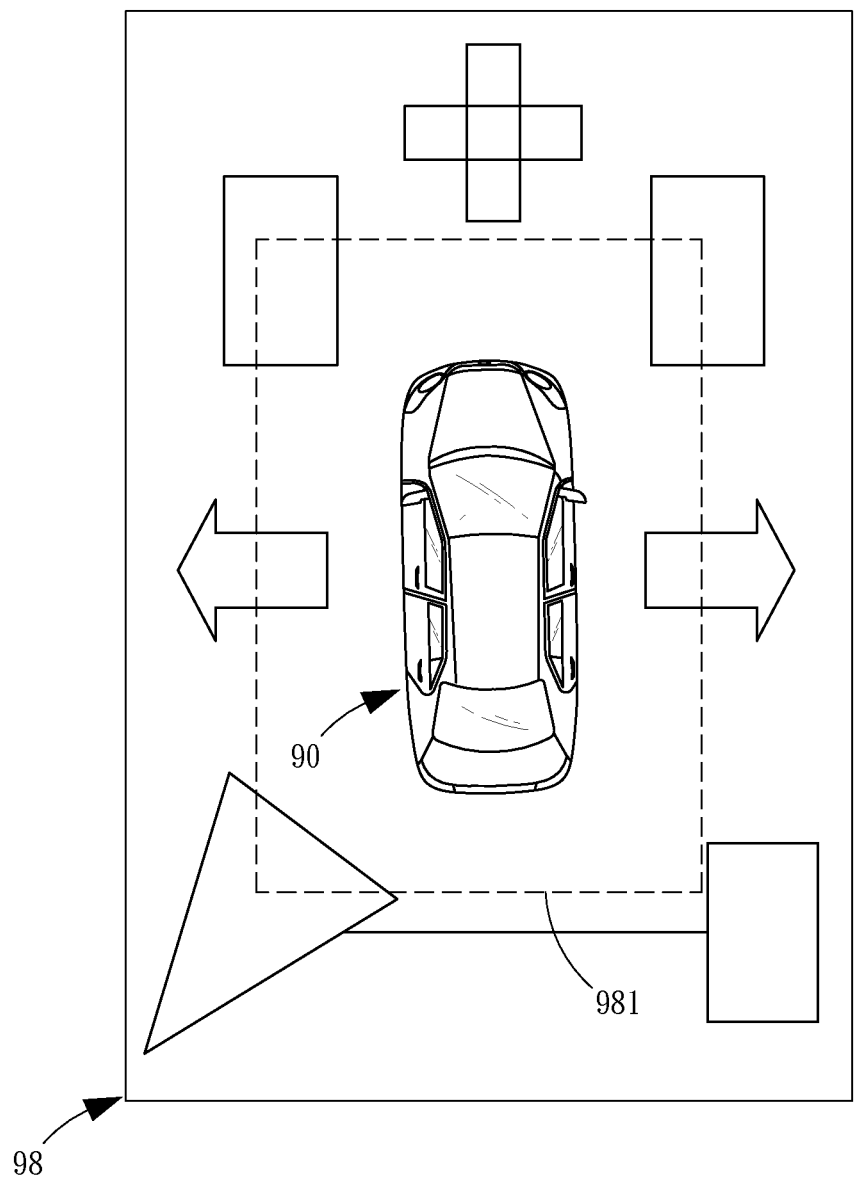

Taking the object 43 exist in real space as shown in FIG. 6A for instance, the coordinate values of its center resulting from a Cartesian coordinate system defined the real space are corresponding to the coordinate values of its center pixel in the surrounding images of FIG. 6B that are resulted form another Cartesian coordinate system defining the image space, whereas the overlapped region 982 from any two adjacent image is processed the same as that shown in FIG. 3E. Since the position and height relating to where the image sensing device is mounted on the carrier, as well as its viewing angle, angle of depression and angle of elevation are known, the relationship between the real world and the image space of the image sensing device can be established in advance so that the conversion between a distance measured in image space and a distance measured in real space can be achieved. In addition, the aforesaid conversion between image space and real space relating to the image sensing devices mounted on a carrier is known to those skilled in the art, and thus will not be described further herein. After the surrounding images being converted into corresponding bird-view images and combined into a surrounding seamless bird-view image, each pixel in the surrounding seamless bird-view image is mapped to its corresponding position in the real space, and accordingly, the center of the carrier 90 can be identified and obtained in the surrounding seamless bird-view image. As the center of the carrier 90 is identified and the size of the carrier 90 with respect to its length and width are known, marking aids for distance estimation, such as the scale lines 980, can be formed in the surrounding seamless bird-view image at their respective specific positions in a manner that they are separated from each other by a specific interval, by that a distance between an obstacle and the carrier can be measured according to the scale lines 980 so as to determine whether the carrier is going to collide with the object under current moving speed and direction. As shown in FIG. 3E, the interval between adjacent scale lines is determined according to actual requirement, that it is possible to establish a scale line every 50 cm. In the embodiment shown in FIG. 6C, the marking aids 981 are frames that are arranged surrounding the carrier 90. Similarly, as the center of the carrier 90 is identified and the size of the carrier 90 with respect to its length and width are known, frames representing danger zones can be established in the surrounding seamless bird-view image that are disposed around the carrier 90 for assisting the maneuvering of the carrier 90. It is noted that the size of the frame can be adjusted at will according to actual requirement.

Figure 7A:
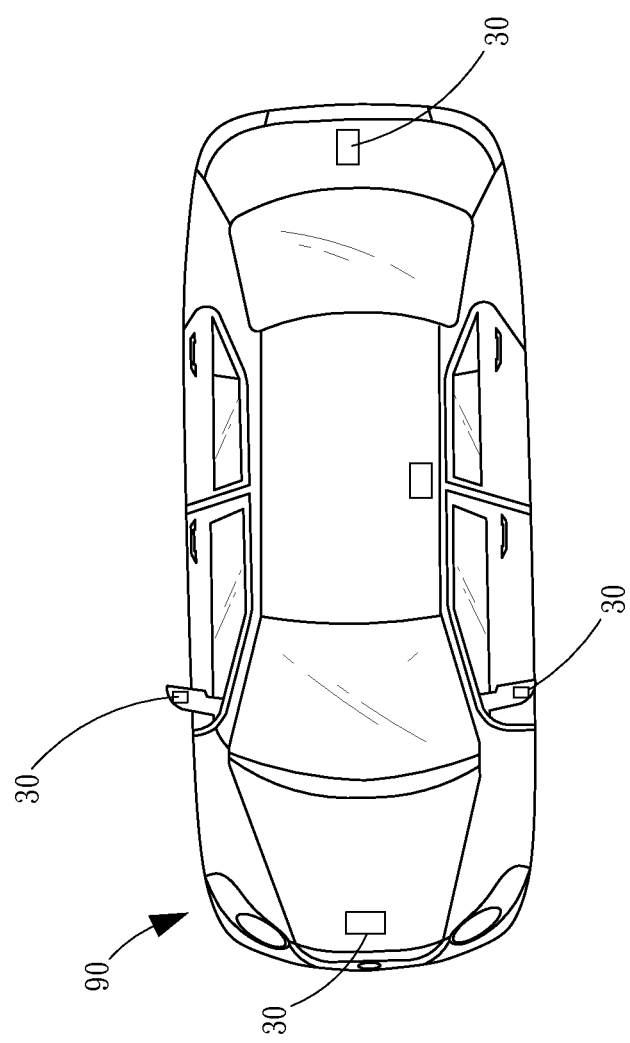
FIG. 7A and FIG. 7B are schematic diagrams showing a system for generating surrounding seamless bird-view image with distance interface according to an embodiment of the present disclosure.
Figure 7B:
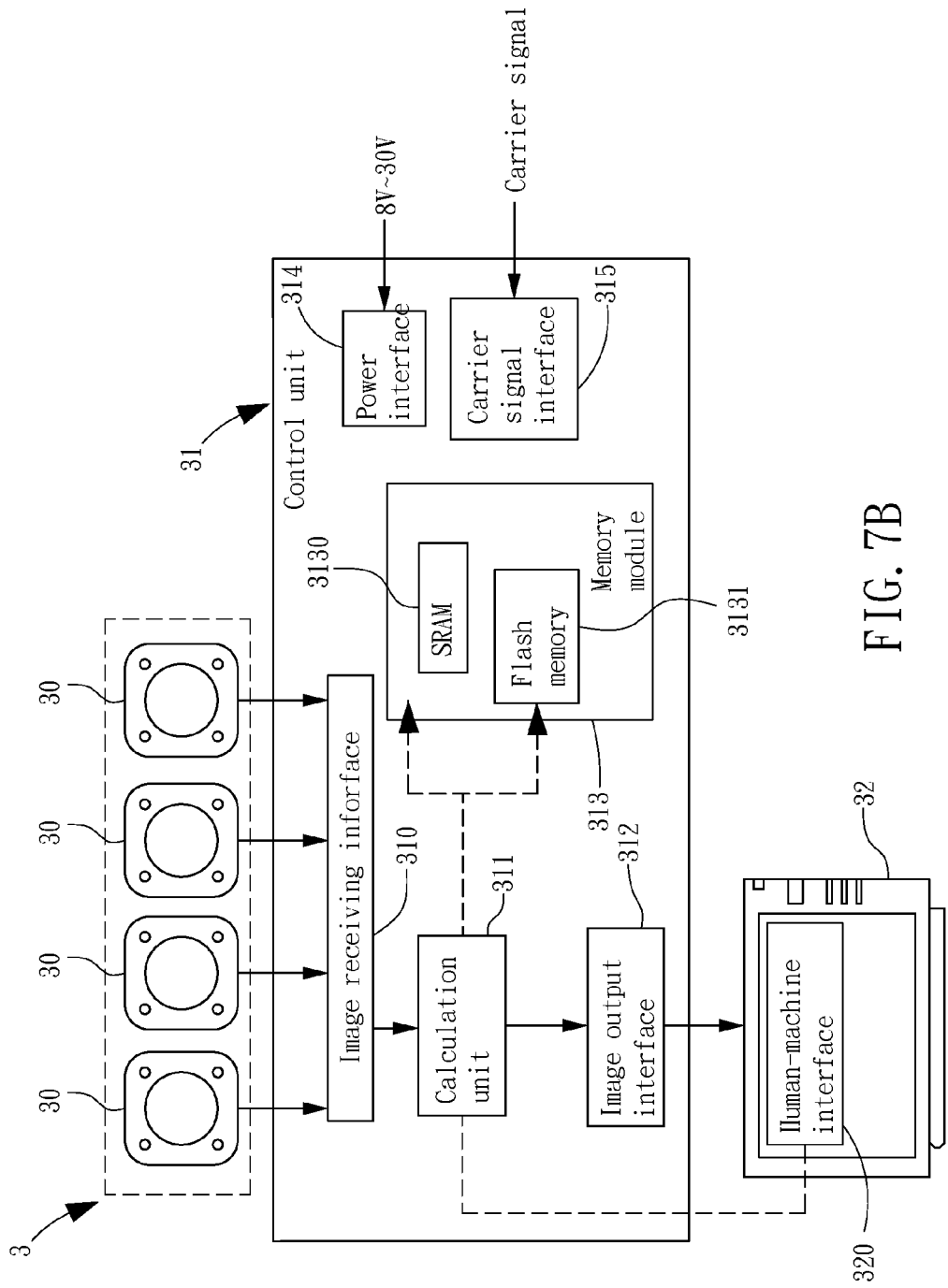

Please refer to FIG. 7A and FIG. 7B, which are schematic diagrams showing a system for generating surrounding seamless bird-view image with distance interface according to an embodiment of the present disclosure. As shown in FIG. 7A and FIG. 7B, the system 3 is comprised of a plurality of imaging devices 30, a control unit 31 and a display unit 32. The plural imaging devices 30 are mounted respectively on a carrier 90 at different positions thereof, each to be used for generating a surrounding image. It is noted that the carrier 90 can be a vehicle, and the imaging devices 30, each capable of being a camera or a camcorder, are mounted on the vehicle respectively at the front side, rear side, left side and right side thereof, but are not limited thereby. Moreover, the amount of the imaging devices 30 being mounted on the carrier 90 is determined according to actual requirement and thus is not limited to the four imaging devices shown in FIG. 7A. As the plural imaging devices 30 are arranged focusing in different directions surrounding the carrier 90, they can be used for generating a plurality of surrounding images with different field-of-views.

The control unit 31, being coupled to the plural imaging devices 30, is used for receiving the plural surrounding images, while it is designed to perform the processes depicted in the flow charts of FIG. 1, FIG. 2, FIG. 4 and FIG. 5, and thereby, acquire a surrounding seamless bird-view image showing the entire view surrounding the carrier 90 and the corresponding auxiliary image containing marking aids for distance estimation. In this embodiment, the control unit 31 further comprises: an image receiving interface 310, a calculation unit 311, an image output interface 312 and a memory module 313. The image receiving interface 310 is coupled to the plural imaging devices 30 for receiving the plural surrounding images. The calculation unit 311 is used for performing the processes depicted in the flow charts of FIG. 1, FIG. 3, FIG. 4 and FIG. 5, and thereby, acquire a surrounding seamless bird-view image showing the entire view surrounding the carrier 90 and the corresponding auxiliary image containing marking aids for distance estimation. The memory module 313 is coupled to the calculation unit 311. In this embodiment, the memory module 313 includes a static random access memory (SRAM) 3130 and a flash memory 131.

Moreover, the image output interface 312 is coupled to the calculation unit 311 and a display unit 32 for transmitting the surrounding seamless bird-view image and the corresponding auxiliary image containing marking aids for distance estimation to the display unit 32. In addition, the control unit 31 further comprises: a power interface 314, for receiving power from a voltage source; and a carrier signal interface 315, for receiving signals generated from the carrier 90. Moreover, the display unit 32, being disposed inside the carrier 90 while coupling to the control unit 31, is provided for receiving and displaying the surrounding seamless bird-view image and the corresponding auxiliary image containing marking aids for distance estimation in a manner that the corresponding auxiliary image containing marking aids for distance estimation is superimposed on the surrounding seamless bird-view image. It is noted that each marking aid in the auxiliary image is an icon selected from the group consisting: a scale line and a frame. Furthermore, the display unit 32 can further be configured for enabling a human-machine interface 320 to be displayed thereon in a form of graphical interface or command interface. Through the human-machine interface 320, instructions from a user relating to the dimensions of the marking aids, including scale lines and frames, can be send to the calculation unit 311 which will then adjust the displaying of those marking aids on the display unit 32 to conform with the type and size of the carrier.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method for generating surrounding seamless bird-view image with distance interface, comprising the steps of:
   providing a plurality of surrounding images;
   converting the plural surrounding images so as to combine the plural converted surrounding images into a surrounding seamless bird-view image; and
   generating an auxiliary image containing marking aids for distance estimation in the surrounding seamless bird-view image,
   wherein converting the plural surrounding images comprises the steps of:
      performing a viewpoint transformation process upon the plural surrounding images for transforming the plural surrounding images into a plurality of corresponding bird-view images,
      identifying a plurality of overlapped regions from pairs of adjacent bird-view images, the overlapped regions having boundaries along lines at which the pairs of adjacent bird-view images begin to overlap,
      performing a weight calculation process for each overlapped region so as to obtain a plurality of overlapped images respectively corresponding to each overlapped region, and
      combining the plural overlapped images and the portions of the plural transformed bird-view images that are not overlapped into the surrounding seamless bird-view image, and
   wherein for each overlapped region, the weight calculation process comprises the steps of:

measuring a first distance along a first direction between each pixel in the overlapped region and a first one of the boundaries of the overlapped region and a second distance between that pixel and a second one of the boundaries of the overlapped region, determining a first weighting value and a second weighting value for each pixel in the overlapped region according to the measured first and second distances of the respective pixel, and performing a weighted feature calculation on an image feature of each pixel in the overlapped region by use of the first weighting value and the second weighting value so as to obtain an overlapped feature for each pixel in the overlapped region.

2. The method of claim 1, wherein the weight calculation process is performed on an image feature, and wherein the image feature is a feature selected from the group comprising: brightness and color.

3. The method of claim 1, wherein the identifying of overlapped region further comprises the steps of:
determining a reference plane;
performing a search in the two adjacent bird-view images along the reference plane for acquiring at least one pair of corresponding points from the two adjacent bird-view images; and
adjusting the two adjacent bird-view images for minimizing an error associating with the at least one pair of corresponding points.

4. The method of claim 3, wherein each of the corresponding points of the two adjacent bird-view images is a specific object in its corresponding bird-view image selected from the group comprising: lines, patterns and texts.

5. The method of claim 3, wherein the adjusting of the two adjacent bird-view images is performed in a manner selected from the group comprising: enabling the two adjacent bird-view images to rotate relative to each other, scaling the two adjacent bird-view images with respect to each other, shifting the two adjacent bird-view images relative to each other, and any combination thereof.

6. The method of claim 3, wherein the error is a mean square of the image feature respectively associating to the at least one pair of the corresponding points in the two adjacent bird-view images.

7. The method of claim 6, wherein the characteristic value is a value selected from the group comprising: a brightness value and a color value.

8. The method of claim 1, wherein further comprising the step of:
transmitting the surrounding seamless bird-view image along with the auxiliary image containing marking aids for distance estimation to a display unit for displaying.

9. The method of claim 1, wherein the plurality surrounding images are obtained by use of a plurality of image sensing devices as the plural image sensing devices are mounted on a carrier at different positions thereof while focusing in different directions around the carrier.

10. The method of claim 9, wherein the carrier is a vehicle.

11. The method of claim 1, wherein each marking aid in the auxiliary image is an icon selected from the group consisting: a scale line and a frame.

12. A system for generating surrounding seamless bird-view image with distance interface, comprising:
a plurality of imaging units, respectively mounted on a carrier at different positions thereof, for generating plural surrounding images;
a control unit for:
performing a viewpoint transformation process upon the plural surrounding images for transforming the plural surrounding images into a plurality of corresponding bird-view images,
identifying a plurality of overlapped regions from pairs of adjacent bird-view images, the overlapped regions having boundaries along lines at which the pairs of adjacent bird-view images begin to overlap,
performing a weight calculation process for each overlapped region so as to obtain a plurality of overlapped images respectively corresponding to each overlapped region, and
combining the plural overlapped images and portions of the plural transformed bird-view images that are not overlapped into the surrounding seamless bird-view image, and
a display unit, for receiving the surrounding seamless bird-view image and an auxiliary signal so as to display the surrounding seamless bird-view image while forming marking aids contained in the auxiliary image signal on the surrounding seamless bird-view image,
wherein for each overlapped region, the weight calculation process is performed by:
measuring a first distance along a first direction between each pixel in the overlapped region and a first one of the boundaries of the overlapped region and a second distance between that pixel and a second one of the boundaries of the overlapped region,
determining a first weighting value and a second weighting value for each pixel in the overlapped region according to the measured first and second distances of the respective pixel, and
performing a weighted feature calculation on an image feature of each pixel in the overlapped region by use of the first weighting value and the second weighting value so as to obtain an overlapped feature for each pixel in the overlapped region.

13. The system of claim 12, wherein the plurality of imaging units are mounted on the carrier respectively at a front side, a rear side, a left side and a right side thereof.

14. The system of claim 12, wherein the control unit further comprises:
an image receiving interface, for receiving the plural surrounding images;
a calculation unit, for performing a process upon the received plural surrounding images so as to form the surrounding seamless bird-view image accordingly;
a memory module, coupled to the calculation unit; and
an image output interface, coupled to the calculation unit and the display unit, for outputting the surrounding seamless bird-view image to the display unit.

15. The system of claim 12, wherein the carrier is a vehicle.

16. The system of claim 12, wherein each marking aid in the auxiliary image is an icon selected from the group consisting: a scale line and a frame.

17. The system of claim 12, wherein the display unit further comprises a human-machine interface.

18. The system of claim 17, wherein the human-machine interface is provided for enabling a user to alter formats of the marking aids.

19. The system of claim 12, wherein the control unit further comprises:
a power interface, for receiving power from a voltage source; and
a carrier signal interface, for receiving signals generated from the carrier.

20. The system of claim 12, wherein each imaging unit is a device selected from the group comprising: a camera and a camcorder.

21. The system of claim 14, wherein the memory module further comprises: a static random access memory and a flash memory.

* * * * *